(12) United States Patent
Chandler et al.

(10) Patent No.: US 8,543,433 B1
(45) Date of Patent: *Sep. 24, 2013

(54) SYSTEM AND METHOD FOR REAL-TIME REVENUE MANAGEMENT

(75) Inventors: Raymond Scott Chandler, Frisco, TX (US); Shau-shiang Ja, Grapevine, TX (US); Timothy Lee Jacobs, Grapevine, TX (US)

(73) Assignee: American Airlines, Inc., Fort Worth, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/462,334

(22) Filed: May 2, 2012

Related U.S. Application Data

(63) Continuation of application No. 12/704,965, filed on Feb. 12, 2010, now Pat. No. 8,190,457, which is a continuation of application No. 10/892,801, filed on Jul. 15, 2004, now abandoned.

(60) Provisional application No. 60/548,452, filed on Feb. 27, 2004.

(51) Int. Cl.
*G06Q 10/00* (2012.01)

(52) U.S. Cl.
USPC .................................................. 705/5

(58) Field of Classification Search
USPC .................................................. 705/5
See application file for complete search history.

(56) References Cited

U.S. PATENT DOCUMENTS

| | | | |
|---|---|---|---|
| 5,255,184 A | 10/1993 | Hornick et al. | |
| 5,897,620 A | 4/1999 | Walker et al. | |
| 5,918,209 A | 6/1999 | Campbell et al. | |
| 6,085,164 A | 7/2000 | Smith et al. | |
| 6,263,315 B1 | 7/2001 | Talluri | |
| 6,418,413 B2 | 7/2002 | DeMarcken et al. | |
| 7,263,496 B1 | 8/2007 | Weigelt et al. | |
| 7,424,449 B2 | 9/2008 | Goel | |
| 7,899,699 B1 | 3/2011 | Kumar | |
| 7,983,956 B1 | 7/2011 | Goel | |
| 8,190,457 B1 * | 5/2012 | Chandler et al. | 705/5 |
| 2005/0108068 A1 | 5/2005 | Marcken et al. | |
| 2010/0250291 A1 | 9/2010 | Walker et al. | |

OTHER PUBLICATIONS

Office Action mailed Oct. 15, 2007, in U.S. Appl. No. 10/892,801; 23 pgs.; United States Patent and Trademark Office, Alexandria, Virginia.

(Continued)

*Primary Examiner* — Shannon Campbell
(74) *Attorney, Agent, or Firm* — Haynes and Boone, LLP

(57) ABSTRACT

A system and method for real-time revenue management is provided. Data is received from a scheduling system pertaining to a network comprising a plurality of legs. A sub-network within the network may be identified, and optimization of the sub-network is triggered. A current inventory information value attributable to the identified sub-network is pro-rated, and an expected traffic value for the identified sub-network is calculated using a forecast of the expected demand, a standard deviation of the demand, a gamma distribution equation, and an unsatisfied demand value. An updated inventory information value for the identified sub-network is generated using the pro-rated inventory information value and an optimization equation, wherein the optimization equation generates a maximum revenue value by adjusting the expected traffic, and the updated inventory information value is transmitted to the scheduling system.

18 Claims, 5 Drawing Sheets

(56) References Cited

OTHER PUBLICATIONS

Final Office Action mailed Apr. 10, 2008, in U.S. Appl. No. 10/892,801; 21 pgs.; United States Patent and Trademark Office, Alexandria, Virginia.
Rent Watch: Lanlord Can Prorate Rent After a Mid-Month Move-In, Los Angeles Times, Los Angeles, CA, Jun. 16, 2002, p. K11, 4pgs.
Advisory Action mailed Jun. 24, 2008, in U.S. Appl. No. 10/892,801; 3 pgs.; United States Patent and Trademark Office, Alexandria, Virginia.
Office Action mailed Sep. 11, 2008, in U.S. Appl. No. 10/892,801; 28 pgs.; United States Patent and Trademark Office, Alexandria, Virginia.
Office Communication mailed Apr. 2, 2009, in U.S. Appl. No. 10/892,801; 4 pgs.; United States Patent and Trademark Office, Alexandria, Virginia.
Final Office Action mailed Aug. 12, 2009, in U.S. Appl. No. 10/892,801; 39 pgs.; United States Patent and Trademark Office, Alexandria, Virginia.
U.S. Appl. No. 60/548,452, filed Feb. 27, 2004, Chandler et al.
U.S. Appl. No. 10/892,801, filed Jul. 15, 2004, Chandler et al.

* cited by examiner

| | $AB_Y$ | $AB_Q$ | $BC_Y$ | $BC_Q$ | $BD_Y$ | $BD_Q$ | $AC_Y$ | $AC_Q$ | $AD_Y$ | $AD_Q$ |
|---|---|---|---|---|---|---|---|---|---|---|
| AB | $a_1$ | $a_2$ | | | | | $a_7$ | $a_8$ | $a_9$ | $a_{10}$ |
| BC | | | $a_3$ | $a_4$ | | | $a_7$ | $a_8$ | | |
| BD | | | | | $a_5$ | $a_6$ | | | $a_9$ | $a_{10}$ |

SYSTEM AND METHOD FOR REAL-TIME REVENUE MANAGEMENT

CROSS REFERENCE TO RELATED PATENT APPLICATIONS

This application is a continuation of U.S. Utility patent application Ser. No. 12/704,965, filed Feb. 12, 2010, entitled System And Method For Real-Time Revenue Management, which is a continuation of U.S. Utility patent application Ser. No. 10/892,801, filed Jul. 15, 2004, entitled System And Method For Real-Time Revenue Management, which claims priority to U.S. Provisional Patent Application Ser. No. 60/548,452, filed Feb. 27, 2004, entitled System And Method For Real-Time Revenue Management, the entire disclosures of which are hereby incorporated by reference.

FIELD OF THE INVENTION

The present invention relates generally to computer software, and more particularly, to a system and method for real-time revenue management.

BACKGROUND

In any industry that involves allocating space, it is generally preferable to maximize the revenue generated from the space. The price associated with a particular space, whether it be, for example, an airline seat, cargo area, space on a flatbed truck, or a pallet in a warehouse, could be priced at, above or below the demand for that space. Presumably, pricing above the demand would prevent the space from being used. Conversely, pricing below the demand may result in lost revenue, since the pricing could have been higher and demand would have still caused the space to be taken.

DETAILED DESCRIPTION

Figure 1:
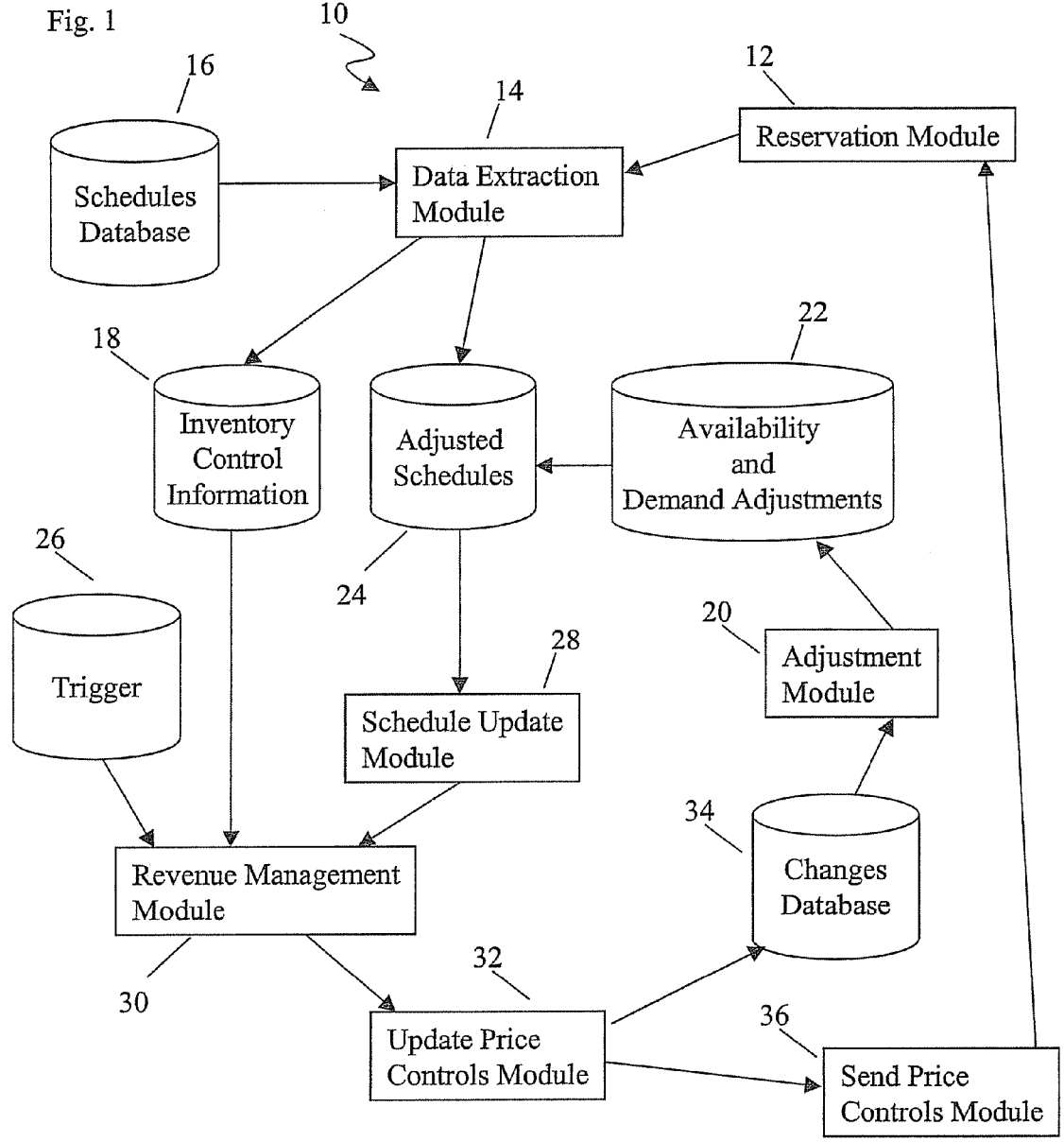
FIG. 1 is a diagram of an example embodiment of the present invention.

This disclosure relates generally to computer software and, more specifically, to a system and method for real-time revenue management. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring now to FIG. 1, a system 10 for real-time revenue management is shown. Reservation module 12 contains all of the information about a particular network, such as travel or logistics industry network, including the rail industry, cruise industry, shipping industry, and bus travel. In one embodiment, reservation module 12 holds all passenger records, bookings and information for passenger airplanes. In a further embodiment, the reservation module 12 may link reservation and schedule data to different distribution channels. An example reservation module is the CRS System from Sabre Inc.

The data extraction module 14 communicates with the reservation module 12 and the schedules database 16. The data extraction module 14 is capable of pulling data from the reservation module 12 and from the schedules database 16. The data extraction module 14 is also capable of providing data to the inventory control information database 18 and the adjusted schedules database 24.

Schedule database 16 is a database that contains schedule and departure information. In one embodiment, schedule database 16 contains arrival and departure information for passenger airplanes. Inventory control information database 18 contains all inventory control information for the network. In one embodiment, the inventory control information includes bid-price values. Bid-price values represent the expected revenue that could be gained by increasing the capacity of one of a particular item in the network. For an embodiment involving the passenger airline industry, the bid price could reflect the expected revenue gained by increasing an aircraft's capacity by one seat. As an inventory control mechanism, bid-prices represent the minimum acceptable value of a unit being sold. In one embodiment, only units exceeding the bid-price are made available for sale. In another embodiment, the inventory control information includes availability values. An availability value represents the available space for a particular item in the network. An availability value within the passenger airline industry might be the space allocated to a specific class of seats on an aircraft.

Adjustments to values used in the real-time revenue management calculations may be made using the adjustment module 20. In one embodiment, the adjustment module 20 can allow analysts to make adjustments to the inventory controls and expected demands using a graphical user interface. For example, an analyst might adjust the number of reservations exceeding the capacity (i.e. overbookings) permitted for a particular flight. The adjustment module 20 communicates with the availability and demand adjustments database 22, which may store the adjusted values received from the adjustment module 20. In one embodiment, adjustment database 22 contains the actual user adjustments to inventory availability and passenger demand for particular flights.

The adjusted schedules database 24 communicates with data extraction module 14 and availability and demand adjustments database 22. The adjusted schedules database 24 contains the schedules and uses the adjustments from the availability and demand adjustments database 22. In one embodiment, the adjusted schedules database 24 serves as a partial view of the total schedule and only contains those parts of the flight schedules that have had adjustments.

Trigger database 26 is a database that contains instructions on when to apply the real-time inventory controls. In one embodiment, the relative time period prior to the relevant date may be used. For example, a rolling thirty (30) day window may be used to trigger real-time revenue management. In an embodiment for the airline industry, the trigger database 26 may contain a number of departure days for flights and as the departure day for a particular flight comes within a certain time period, the trigger database 26 communicates with the revenue management module 30 to optimize that particular flight.

Schedule update module 28 communicates with the adjusted schedules database 24 to retrieve schedule data and to update the schedule data with the user adjustments for revenue management processing. Revenue management module 30 communicates with the inventory control information database 18, the trigger database 26, and the schedule update module 28. The revenue management module 30 may include a batch revenue management process and the real-time revenue management process. In one embodiment, departure dates specified by the trigger database 26 are processed using the real-time revenue management process as data becomes available from the data extraction module 14. Inputs into the revenue management module 30 could include remaining capacity, demand/fare class, coefficient of variation of demand, fare itinerary, and revenue/itinerary.

The update price controls module 32 communicates with the revenue management module 30 to load the updated bid-price controls outputted from the revenue management module 30. In one embodiment, the price controls module 32 applies the 1-up strategy for flights using real-time revenue management.

Changes database 34 communicates with the update price controls module 32 and contains detailed records of changes. The changes database 34 can also provide feedback to the adjustment module 20. In one embodiment, the changes database 34 may contain records of changes to individual flights.

The send price controls module 36 communicates with the update price controls module 32 and sends updated information to the reservation module 12.

While depicted as distinct modules or elements, the modules and elements described herein may be combined into a single module or other number of modules, and may further be implemented in hardware or software form, or a combination thereof.

Figures 2, 3:
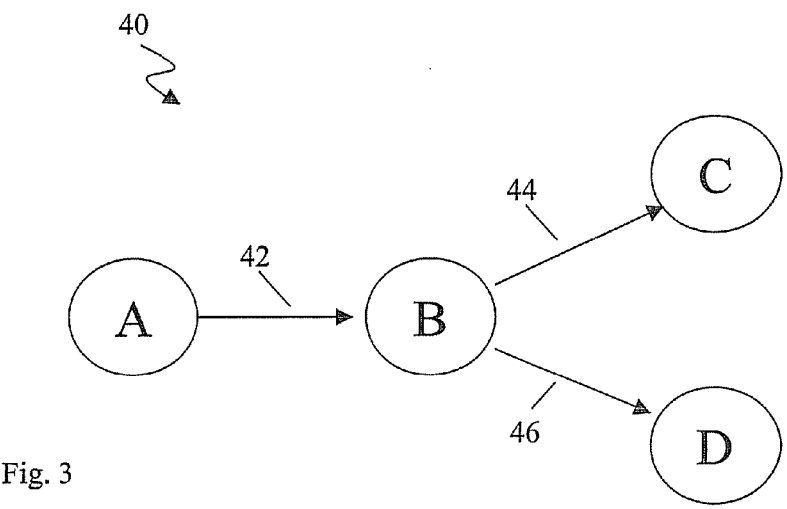
FIG. 2 is a diagram of an example sub-network.
FIG. 3 is an example matrix depicting availability in the example sub-network.

Referring now to FIG. 2, an example sub-network 40 that may be contained within a network used in conjunction with an embodiment of the present invention is shown. The sub-network 40 contains a destination A, a destination B, a destination C, and a destination D. Destination A and destination B are connected by an origination-destination (a "leg") 42. Leg 44 connects destination B and destination C, and leg 46 connects destination B and destination D.

Referring to FIG. 3, an example matrix 60 is shown. The matrix 60 is a visual representation of the inter-relationship between availability of units for a particular type for a particular leg and other legs within a sub-network (or the entire network). In this example, the matrix shows the availability for the sub-network 40 shown in FIG. 2. For purposes of illustration, two types of units are shown as Y and Q. While two types of units are used, it is understood that any number of types and nomenclature could be used. For purposes of discussion, an embodiment involving air travel will be portrayed, and in this embodiment, Q might represent seats on an airplane priced at $150 and Y might represent seats priced at $350.

Row AB represents leg 42 (FIG. 2), row BC represents leg 44 (FIG. 2) and row BD represents leg 46 (FIG. 2). The columns represent the itineraries that are available to customers. For example, column $AB_Y$ represents the itinerary starting from destination A and ending at destination B with a Y class seat. $AD_Q$ represents the itinerary starting from destination A and ending at destination D with a Q class seat. $a_1$-$a_{10}$ represent the number of seats available in that class of seat for that itinerary. Thus, $a_1$ represents the number of seats available for a Y class seat for the itinerary from destination A to destination B.

Availability is the number of seats for a particular class for a particular itinerary. Capacity is the total number remaining seats on a particular flight. In some instances, the availability and capacity may be the same. Remaining capacity represents the total number of seats on the plane adjusted for overbooking minus the number of firm reservations holding at that time. The sum of the availability across a row in the matrix must be less than or equal to the remaining capacity for the leg represented by the row. For example, the sum of $a_3+a_4+a_7+a_8$ (the availabilities in row BC) must be less than or equal to the remaining capacity for the plane for leg 44 (from destination B to destination C). This is referred to as the "Sum of the availability for each ODF" for purposes of optimizing the bid prices for a particular leg, as described in more detail below.

Matrix 60 illustrates the concept of "displacement." Displacement occurs when a particular seat on a particular leg is purchased. Since the sum of the availabilities on a row cannot exceed the remaining capacity (e.g. the remaining seats on a particular flight), the reduction of the availability as a result of a decrease in the capacity (e.g. a ticket purchased) may result in the inability to offer for sale a seat on a leg further along the same row. Up-line displacement is the cost of removing a seat from an up-line leg in a particular passenger's itinerary. Down-line displacement is the cost of removing a seat from a down-line leg in a particular passenger's itinerary.

Figure 4:
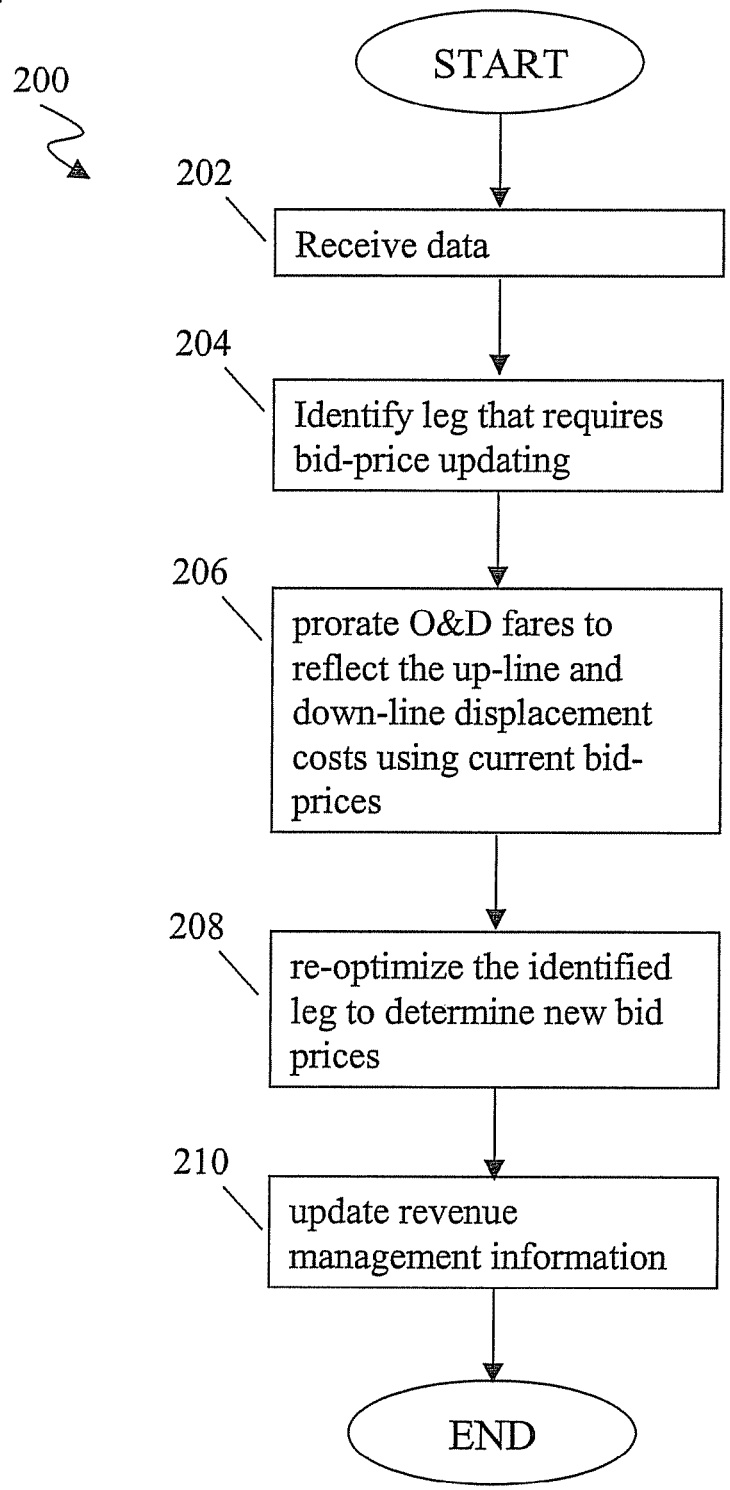
FIG. 4 depicts the operational flow of an embodiment of the present invention.

Referring now to FIG. 4, an operational flow 200 of an embodiment of the present invention is shown. In step 202, data is pulled from the reservation system. In one embodiment, data is pulled substantially continuously from the reservation system. In another embodiment, data is received from the reservation each time a booking of a seat on a flight occurs. In another embodiment, the data could be pulled based on conditions, such as flight departure dates or booking activity. Other conditions could be demand driven dispatch (e.g. swapping aircraft, thus changing capacity to capture incremental demand) or if a particular parameter has been changed (such as overbooking).

At step 204, the particular leg, sub-network of legs, or the network that requires bid-price updating is identified. Legs (or sub-networks or networks) may be identified using metrics. An example metric could identify flights based on day of departure, such as "all flights within thirty days of departure are to be updated." A second metric that may be used is to identify a flight based on booking activity. For example, once a certain number of bookings on a particular flight exceeds a predetermined threshold, that flight could be identified for updating.

At step 206, the origination and destination fares may be pro-rated to reflect any up-line or down-line displacement costs based on the current bid-prices. In one embodiment, heuristics can be used to take into account the up-line and down-line displacement costs. In another embodiment, the proration of the fares could be zero, thus using the entire price of a ticket. In a further embodiment, the prorated revenue is calculated using the relative distance of the leg with respect to the total distance of the itinerary. In yet another embodiment, the pro-rated revenue is calculated using the bid-price to reflect the displacement cost associated with allocating a seat on that flight leg. This embodiment can be reflected with the equation:

$$\text{Prorated Revenue} = \text{Total}_{ODF} - 3(\text{bid-prices for the remaining legs})$$

In a further embodiment, a proportionality equation can be used. One such equation is represented as:

$$\text{Prorated Revenue} = \text{Total}_{ODF} * \text{Bid-Price of Identified Leg}/3(\text{bid-prices for all legs})$$

For illustrative purposes of the different pro-ration methods, an example one-way airline ticket from Boston to Los Angeles, which connects through Dallas, will be used in a scenario where the flight from Boston to Dallas has been identified for bid-price updating. The overall cost of the ticket is $300, the bid-price for Boston to Dallas has been set at $120 and the bid-price for Dallas to Los Angeles has been set at $110.

Using a zero proration pro-ration embodiment with the illustrative example would result in a prorated revenue for the identified leg of $300. Using the relative distance pro-ration embodiment requires the distances for the flights. Assuming that the flight from Boston to Dallas is 1000 miles and the flight from Dallas to Los Angeles is 2000 miles, then the flight distance of the identified leg is one-third of the total distance, and the prorated revenue would be $100 (or one-third of $300).

Using the allocation pro-ration embodiment, to determine the representation of the value of the Boston-Dallas leg, the system subtracts the displacement cost of allocating a seat on the downline leg (Dallas to Los Angeles), resulting in a prorated revenue of $190 ($300-$110=$190).

Using the proportionality equation pro-ration embodiment, the prorated revenue for the Boston-Dallas leg would be $300*$120/($110+$120), which results in $156.

At step 208, the identified leg (or sub-network or network) is re-optimized to determine updated bid prices. In one embodiment, the optimization is conducted using the following equation to solve for Revenue$_{ODF}$:

$$\text{Maximum Revenue} = 3(\text{Revenue}_{ODF} * \text{Expected Traffic})$$

where:
  ODF is the origination-destination fare (e.g. AB$_Y$).
  Expected Traffic is the number of people who are expected to buy a seat for that ODF at a bid-price.
subject to:
  Sum of the availability for each ODF<=remaining capacity on the flight.

The optimization equation is solved to generate the highest Maximum Revenue value based on the Expected Traffic, subject to the availability constraint. The solution is implemented using either the bid-price or the actual seat availability to control the inventory. In one embodiment, the Expected Traffic can be calculated using three components. In another embodiment, the optimization may a series of optimization equations.

The first component is a forecast of the expected demand (e.g. the number of people that are expected to want to buy a ticket at a particular price). In one embodiment, the expected demand could be the average of the expected demand over a particular historical period. In another embodiment, the expected demand could be the average of the expected demand over a particular historical, but weighted toward a more recent time period. Other methods also exist for determining the expected demand.

The second component is a variance or a standard deviation of the demand. The second component acts as a variance on the expected demand. As an example, if the expected demand is determined to be 10 people who want to buy a ticket at a particular price, then the second component could be a standard deviation of plus or minus 2 (e.g. that the actual demand is expected to be the range of 8 to 12).

The third component is the form of the distribution. In one embodiment, the form of the distribution can be a gamma distribution equation. In this embodiment, the first two components along with an estimate of the bid-price are the three input values into the gamma distribution. The inverse gamma distribution is used to estimate the decision variable, which represents the availability. The distribution shows the probability that the demand is going to be less than the availability. The result of the gamma distribution equation results in the allocation of seats for this specific ODF. At this point, the Expected Traffic value represents the expected number of passengers based on the allocation of seats for the specific ODF. The inverse gamma distribution is used to determine the allocation. From the availability, the Expected Traffic can be calculated. Using the availability resulting from the gamma distribution, the bid-price is altered until the sum of availabilities is less than or equal to the remaining capacity.

In another embodiment, there is a fourth component, which is the expected "spill". Spill is the amount of unsatisfied demand for a particular ODF and represents the difference between the expected demand and the Expected Traffic. Some possible methods of calculating spill include using proportional demand, expected marginal seat revenue, origination and destination passenger mix, or equilibrium models. The expected demand, variance, and the allocation of seats for the specific ODF are placed into a "spill" equation. In this embodiment, the spill is subtracted from the expected demand conditioned on the allocated seats for the specific ODF.

Since Expected Traffic for an ODF is affected by the allocation (which, in turn, is generated using the bid-price), then altering the bid price changes the Expected Traffic.

The remaining capacity on a flight changes as bookings occur or as may be manually modified. Examples of modifications could be the result of a different size plane being used or a change in the permitted overbookings for the flight. When a single leg or sub-network is optimized, the constraint is only formulated for the leg (or the legs within the sub-network) being considered.

At step 210, the resulting bid price or bid-prices may be provided to the revenue management information.

Figure 5:
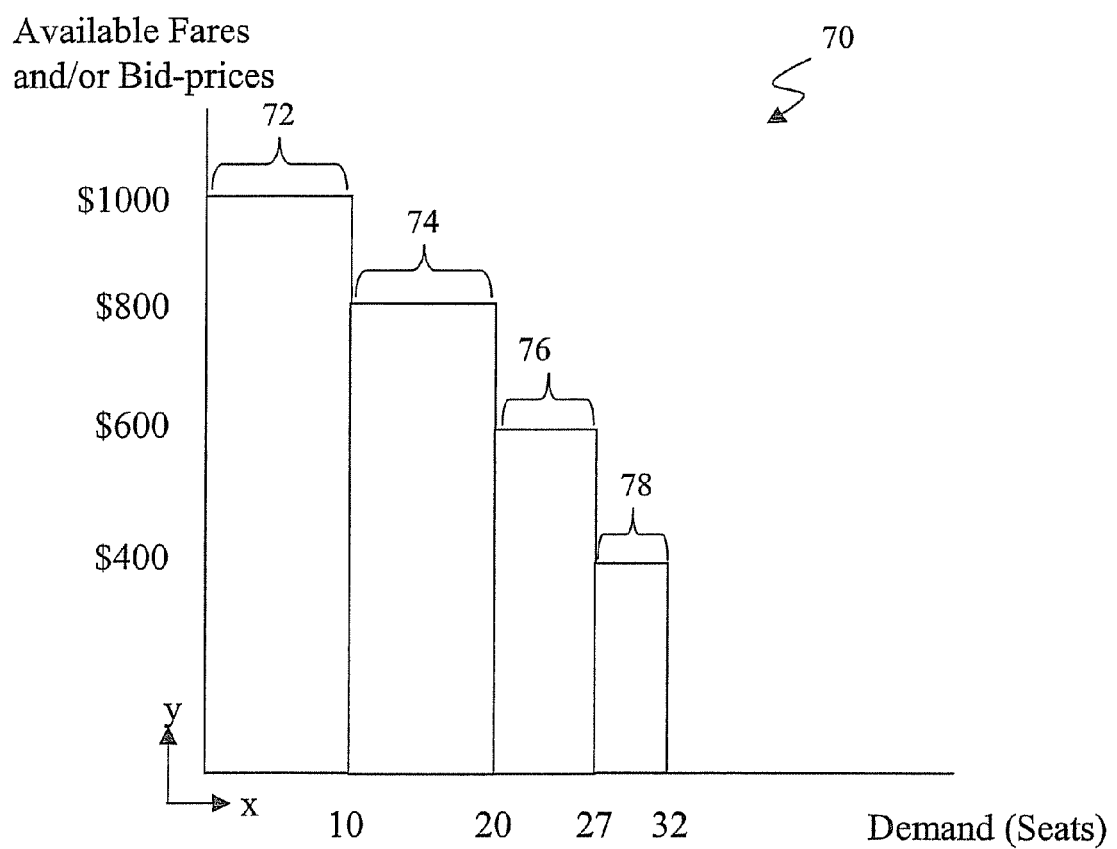
FIG. 5 depicts an example demand/bid-price graph.

Referring now to FIG. 5, a sample depiction 70 of seat allocation and bid-prices as could occur in one embodiment is shown. In this embodiment, the x-axis of the graph represents the demand, while the y-axis represents different bid-prices. Alternatively, the y-axis could represent the available fares. In this example, the overall demand for this particular origination-destination is 32 passengers. Bar 72 represents the number of seats that are offered at the $1000 fare (10 seats). Bar 74 represents the number of seats that are offered at the $800 fare (10 seats). Bar 76 represents the number of seats that are offered at the $600 fare (7 seats), and bar 78 represents the number of seats that are offered at the $400 fare (5 seats). Using this example, if the plane for this origination-destination has a capacity of fifty, then the effective bid-price is set to $0. Since the capacity exceeds the demand, the revenue is maximized by selling each of the seats at the highest fare possible. If the plane has a capacity of thirty, then the effective bid-price is set at $400. If three more seats are purchased (resulting in a capacity of 26), then the optimization would result in a bid-price of $600.

Figure 6:
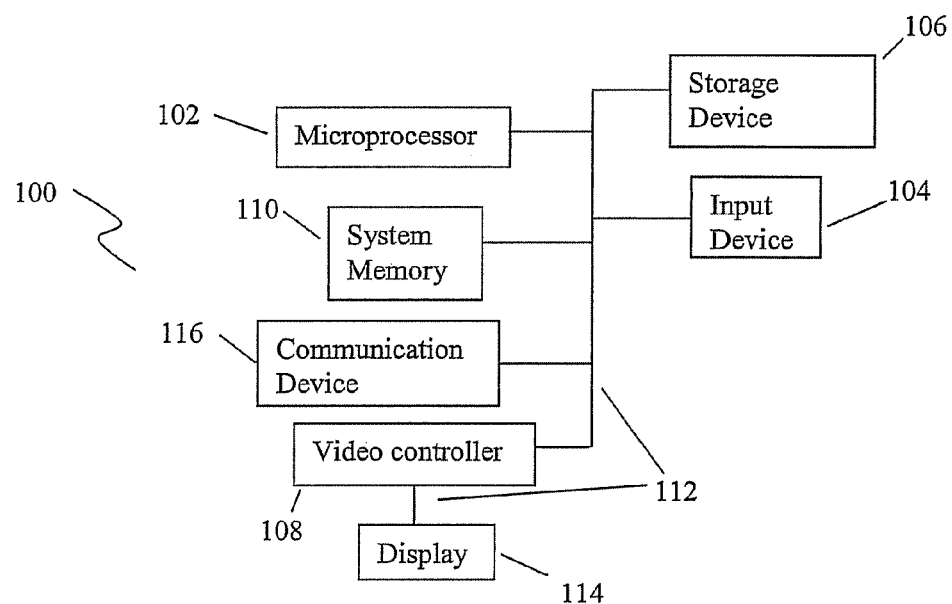
FIG. 6 depicts an example system for implementing an embodiment of the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 6, an illustrative node 100 for implementing an embodiment of the method is depicted. Node 100 includes a microprocessor 102, an input device 104, a storage device 106, a video controller 108, a system memory 110, and a display 114, and a communication device 116 all interconnected by one or more buses 112. The storage device 106 could be a floppy drive, hard drive, CD-ROM, optical drive, or any other form of storage device. In addition, the storage device 106 may be capable of receiving a floppy disk, CD-ROM, DVD-ROM, or any other form of computer-readable medium that may contain computer-executable instructions. Further communication device 116 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

Provided is a unique system and method for real-time revenue management. In one embodiment, a data extraction module retrieves data from a scheduling system. An adjustment module communicates with the data extraction module and allows adjustment of the data. A revenue management module communicates with the data extraction module and is capable of determining displacement and generating a inventory information value utilizing the data.

In another embodiment, data is received from a scheduling system pertaining to a network comprising a plurality of legs, and a sub-network within the network is identified. The data pertaining to the sub-network is pro-rated, and the identified sub-network is optimized using the pro-rated data.

In a further embodiment, a computer-readable medium comprising a series of instructions for execution by at least computer processor is described, wherein the instructions are for receiving data substantially continuously from a reservation system pertaining to a travel network comprising a plurality of legs, identifying a sub-network within the travel network, pro-rating a current inventory information value attributable to the identified sub-network, generating an updated inventory information value for the identified sub-network using the pro-rated inventory information value and an optimization equation, and transmitting the updated inventory information value to the reservation system.

In an additional embodiment, a system for real-time management of revenue in the airline industry, comprises a means for receiving data substantially continuously from a reservation system pertaining to a travel network comprising a plurality of legs, a means for identifying a sub-network within the travel network, a means for triggering optimization of a sub-network within the network, a means for pro-rating a current inventory information value attributable to the identified sub-network, a means for generating an updated inventory information value for the identified sub-network using the pro-rated inventory information value and an optimization equation, and a means for transmitting the updated inventory information value to the reservation system.

In yet another embodiment, data with respect to at least one booking for a seat on an airplane is received substantially continuously from a computerized reservation system pertaining to an airline industry network comprising a plurality of legs. Optimization of a sub-network within the network is triggered. A current inventory information value attributable to the identified sub-network is pro-rated, and an expected traffic value for the identified sub-network is calculated using a forecast of the expected demand, a standard deviation of the demand, a gamma distribution equation, and an unsatisfied demand value. An updated inventory information value for the identified sub-network is generated using the pro-rated inventory information value and an optimization equation, wherein the optimization equation generates a maximum revenue value by adjusting the expected traffic, and the updated inventory information value is transmitted to the scheduling system.

While the examples and naming conventions used herein have been related to air travel, it is understood that the system and method for real-time revenue management could be used in any form of travel or logistics industry, including the rail industry, cruise industry, shipping industry, and bus travel. The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of determining respective minimum fares at which to offer respective seats associated with respective ones of a plurality of air travel itineraries, each respective seat belonging to a first fare class of seats associated with one of the air travel itineraries, the plurality of air travel itineraries comprising:
   a first air travel itinerary from a first destination to a second destination, the first air travel itinerary having:
      a first fare for each seat that belongs to the first fare class of seats associated with the first air travel itinerary; and
      a first leg from the first destination to the second destination, the first leg having a first remaining capacity of seats and an initial first bid price;
   a second air travel itinerary from the first destination to the third destination, the second air travel itinerary having:
      a second fare for each seat that belongs to the first fare class of seats associated with the second air travel itinerary;
      the first leg from the first destination to the second destination; and
      a second leg from the second destination to the third destination, the second leg having a second remaining capacity of seats and an initial second bid price;
   a third air travel itinerary from the first destination to a fourth destination, the third air travel itinerary having:
      a third fare for each seat that belongs to the first fare class of seats associated with the third air travel itinerary;
      the first leg from the first destination to the second destination; and
      a third leg from the second destination to the fourth destination, the third leg having a third remaining capacity of seats and an initial third bid price;
   and
   a fourth air travel itinerary from the second destination to the third destination, the fourth air travel itinerary having:
      a fourth fare for each seat that belongs to the first fare class of seats associated with the fourth air travel itinerary; and
      the second leg from the second destination to the third destination;
   the method comprising:
   providing a node, the node comprising:
      a computer processor;
      a storage device; and
      a plurality of instructions stored in the storage device and executable by the computer processor;
      detecting an airline flight booking, the airline flight booking being associated with the fourth air travel itinerary and thus the airline flight booking resulting in a change to the second remaining capacity of the second leg;
   and
   executing the plurality of instructions with the computer processor so that the following steps are executed:
      pro-rating the third fare of the third air travel itinerary to determine a pro-rated third fare associated with the first leg;
      optimizing respective numbers of seats expected to be allocated to the respective first fare classes associated with the first, second, third and fourth air travel itineraries, comprising:
         (a) altering the initial first bid price and the initial second bid price to thereby alter the respective numbers of seats expected to be allocated to the respective first fare classes associated with the first, second, third and fourth air travel itineraries;
         (b) during altering the initial first bid price and the initial second bid price, preventing a number of seats to be made available on the first leg, as a result of altering the respective numbers of seats expected to be allocated to the respective first fare classes associated with the first, second, third and fourth air travel itineraries, from being greater than the first remaining capacity of seats on the first leg;
         (c) during altering the initial first bid price and the initial second bid price, preventing a number of seats to be made available on the second leg, as a result of altering the respective numbers of seats expected to be allocated to the respective first fare classes associated with the first, second, third and fourth air travel itineraries, from being greater than the changed second remaining capacity of seats on the second leg;
         and
         (d) repeating (a), (b) and (c) until a maximum revenue is obtained.

2. The method of claim 1 wherein the maximum revenue equals the sum of at least:
   the first fare multiplied by the optimized number of seats expected to be allocated to the first fare class associated with the first travel itinerary;
   the second fare multiplied by the optimized number of seats expected to be allocated to the first fare class associated with the second air travel itinerary;
   the pro-rated third fare multiplied by the optimized number of seats expected to be allocated to the first fare class associated with the third air travel itinerary; and
   the fourth fare multiplied by the optimized number of seats expected to be allocated to the first fare class associated with the fourth air travel itinerary.

3. The method of claim 1 wherein the minimum fare at which to offer a seat that belongs to the first fare class associated with the first travel itinerary is equal to the altered first bid price that corresponds to the maximum revenue.

4. The method of claim 1 wherein the minimum fare at which to offer a seat that belongs to the first fare class associated with the second travel itinerary is equal to the sum of:
   the altered first bid price that corresponds to the maximum revenue, and
   the altered second bid price that corresponds to the maximum revenue.

5. The method of claim 1 wherein the minimum fare at which to offer a seat that belongs to the first fare class associated with the third travel itinerary is equal to the sum of:

the altered first bid price that corresponds to the maximum revenue, and the initial third bid price.

6. The method of claim 1 wherein the minimum fare at which to offer a seat that belongs to the first fare class associated with the fourth travel itinerary is equal to the altered second bid price that corresponds to the maximum revenue.

7. The method of claim 1 wherein the plurality of air travel itineraries further comprises a fifth air travel itinerary from the second destination to the fourth destination, the fifth air travel itinerary having:
   a fifth fare for each seat that belongs to the first fare class of seats associated with the fifth air travel itinerary; and
   the third leg from the second destination to the fourth destination;
and
wherein the minimum fare at which to offer a seat that belongs to the first fare class associated with the fifth travel itinerary is equal to the initial third bid price.

8. The method of claim 1 wherein pro-rating the third fare of the third air travel itinerary to determine the pro-rated third fare associated with the first leg comprises:
   multiplying the third fare by the quotient of the initial first bid price divided by the sum of the initial first bid price and the initial third bid price.

9. The method of claim 1 wherein pro-rating the third fare of the third air travel itinerary to determine the pro-rated third fare associated with the first leg comprises:
   subtracting the initial third bid price from the third fare.

10. A computer-readable medium comprising a series of instructions for execution by at least one computer processor, wherein the series of instructions are for determining respective minimum fares at which to offer respective seats associated with respective ones of a plurality of air travel itineraries, each respective seat belonging to a first fare class of seats associated with one of the air travel itineraries, the plurality of air travel itineraries comprising:
   a first air travel itinerary from a first destination to a second destination, the first air travel itinerary having:
      a first fare for each seat that belongs to the first fare class of seats associated with the first air travel itinerary; and
      a first leg from the first destination to the second destination, the first leg having a first remaining capacity of seats and an initial first bid price;
   a second air travel itinerary from the first destination to the third destination, the second air travel itinerary having:
      a second fare for each seat that belongs to the first fare class of seats associated with the second air travel itinerary;
      the first leg from the first destination to the second destination; and
      a second leg from the second destination to the third destination, the second leg having a second remaining capacity of seats and an initial second bid price;
   a third air travel itinerary from the first destination to a fourth destination, the third air travel itinerary having:
      a third fare for each seat that belongs to the first fare class of seats associated with the third air travel itinerary;
      the first leg from the first destination to the second destination; and
      a third leg from the second destination to the fourth destination, the third leg having a third remaining capacity of seats and an initial third bid price;
and
   a fourth air travel itinerary from the second destination to the third destination, the fourth air travel itinerary having:
      a fourth fare for each seat that belongs to the first fare class of seats associated with the fourth air travel itinerary; and
      the second leg from the second destination to the third destination;
the series of instructions comprising:
   instructions for detecting an airline flight booking, the airline flight booking being associated with the fourth air travel itinerary and thus the airline flight booking resulting in a change to the second remaining capacity of the second leg;
   instructions for pro-rating the third fare of the third air travel itinerary to determine a pro-rated third fare associated with the first leg;
and
   instructions for optimizing respective numbers of seats expected to be allocated to the respective first fare classes associated with the first, second, third and fourth air travel itineraries, comprising instructions for:
      (a) altering the initial first bid price and the initial second bid price to thereby alter the respective numbers of seats expected to be allocated to the respective first fare classes associated with the first, second, third and fourth air travel itineraries;
      (b) during altering the initial first bid price and the initial second bid price, preventing a number of seats to be made available on the first leg, as a result of altering the respective numbers of seats expected to be allocated to the respective first fare classes associated with the first, second, third and fourth air travel itineraries, from being greater than the first remaining capacity of seats on the first leg;
      (c) during altering the initial first bid price and the initial second bid price, preventing a number of seats to be made available on the second leg, as a result of altering the respective numbers of seats expected to be allocated to the respective first fare classes associated with the first, second, third and fourth air travel itineraries, from being greater than the changed second remaining capacity of seats on the second leg;
and
      (d) repeating (a), (b) and (c) until a maximum revenue is obtained.

11. The computer-readable medium of claim 10 wherein the maximum revenue equals the sum of at least:
   the first fare multiplied by the optimized number of seats expected to be allocated to the first fare class associated with the first travel itinerary;
   the second fare multiplied by the optimized number of seats expected to be allocated to the first fare class associated with the second air travel itinerary;
   the pro-rated third fare multiplied by the optimized number of seats expected to be allocated to the first fare class associated with the third air travel itinerary; and
   the fourth fare multiplied by the optimized number of seats expected to be allocated to the first fare class associated with the fourth air travel itinerary.

12. The computer-readable medium of claim 10 wherein the minimum fare at which to offer a seat that belongs to the first fare class associated with the first travel itinerary is equal to the altered first bid price that corresponds to the maximum revenue.

13. The computer-readable medium of claim 10 wherein the minimum fare at which to offer a seat that belongs to the first fare class associated with the second travel itinerary is equal to the sum of:
the altered first bid price that corresponds to the maximum revenue, and
the altered second bid price that corresponds to the maximum revenue.

14. The computer-readable medium of claim 10 wherein the minimum fare at which to offer a seat that belongs to the first fare class associated with the third travel itinerary is equal to the sum of:
the altered first bid price that corresponds to the maximum revenue, and
the initial third bid price.

15. The computer-readable medium of claim 10 wherein the minimum fare at which to offer a seat that belongs to the first fare class associated with the fourth travel itinerary is equal to the altered second bid price that corresponds to the maximum revenue.

16. The computer-readable medium of claim 10 wherein the plurality of air travel itineraries further comprises a fifth air travel itinerary from the second destination to the fourth destination, the fifth air travel itinerary having:
a fifth fare for each seat that belongs to the first fare class of seats associated with the fifth air travel itinerary; and
the third leg from the second destination to the fourth destination;
and
wherein the minimum fare at which to offer a seat that belongs to the first fare class associated with the fifth travel itinerary is equal to the initial third bid price.

17. The computer-readable medium of claim 10 wherein instructions for pro-rating the third fare of the third air travel itinerary to determine the pro-rated third fare associated with the first leg comprise:
instructions for multiplying the third fare by the quotient of the initial first bid price divided by the sum of the initial first bid price and the initial third bid price.

18. The computer-readable medium of claim 10 wherein instructions for pro-rating the third fare of the third air travel itinerary to determine the pro-rated third fare associated with the first leg comprise:
instructions for subtracting the initial third bid price from the third fare.

* * * * *